United States Patent

[11] 3,601,243

| [72] | Inventor | Stanley S. Gurgacz<br>New Castle, Pa. |
|---|---|---|
| [21] | Appl. No. | 828,929 |
| [22] | Filed | May 29, 1969 |
| [45] | Patented | Aug. 24, 1971 |
| [73] | Assignee | Interpace Corporation |

[54] TRANSFER MECHANISM
3 Claims, 8 Drawing Figs.

[52] U.S. Cl. .................................................. 198/30,
198/34, 198/35, 214/1 BH
[51] Int. Cl. ............................................. B65g 47/32
[50] Field of Search ........................................... 198/30, 31
A, 33, 34, 35; 294/87; 214/1 B, 1 BS

[56] References Cited
UNITED STATES PATENTS

| 2,903,290 | 9/1959 | Morris et al. .................. | 214/1 BS |
| 3,318,068 | 5/1967 | Voullaire...................... | 294/87 X |
| 3,360,102 | 12/1967 | Cummings..................... | 198/31 (A 3) |
| 3,448,865 | 6/1969 | Schroder........................ | 294/87 X |
| 3,506,140 | 4/1970 | Kock et al...................... | 294/87 X |

*Primary Examiner*—Evon C. Blunk
*Assistant Examiner*—W. Scott Carson
*Attorney*—Charles E. Baxley ABSTRACT: The present kiln loader transfer mechanism has first and second parallel rows of pickup spindles for respectively picking up ware pieces and ware support discs arranged in parallel rows extending lengthwise of an inlet conveyor. The transfer mechanism is turned horizontally to deposit the ware pieces and ware support discs in rows on a kiln conveyor at 60° to the latter. While being turned, the transfer mechanism reduces the spacing between the articles in each row and reduces the spacing between the two rows by a predetermined adjustable amount which insures that the discs will be aligned with the ware pieces lengthwise of the kiln conveyor.

TRANSFER MECHANISM

This invention relates to a transfer mechanism for simultaneously transferring two groups of articles from one conveyor to another and for changing the positional relationship among the articles in each group and the positional relationship between the two groups as they are transferred from one conveyor to the other.

In its preferred embodiment the present invention is used for transferring a group of ceramic ware pieces and refractory supports for the ware pieces from an inlet conveyor to a conveyor which carries the supports and the ware pieces through a tunnel kiln. In U.S. Pat No. 3,360,102, which is assigned to the assignee of the present application, a kiln loader is disclosed which in each transfer operation picks up a group of ware pieces which are spaced apart along a single row running lengthwise of an inlet conveyor and transfers the group of ware pieces onto a kiln conveyor to form a row running transverse to the latter's length. The transfer mechanism reduces the spacing between the ware pieces in each group so that they are deposited on the kiln conveyor for maximum "packing," with the spacing on the kiln conveyor between the ware pieces in each transverse row being minimized, as is the spacing between successive transverse rows of ware pieces. Preferably, the transverse rows of ware pieces on the kiln conveyor extend at 60° to its length, and the ware pieces in each row are longitudinally aligned with ware pieces in the preceding and following 60° rows.

The present invention is directed to a novel transfer mechanism which in its preferred embodiment incorporates the advantageous principles of operation of the apparatus disclosed in said U.S. Pat. No. 3,360,102 and which is further adapted to transfer two parallel groups of articles at one time. In the present transfer apparatus the spacing between the two groups of articles is changed, while the spacing between the articles within each group is being changed, in such a manner as to establish the desired alignment among the articles as explained hereinafter.

In the presently preferred application, this transfer mechanism picks up from an inlet conveyor a group of ware pieces and a parallel group of refractory support discs, both extending longitudinally along an inlet conveyor, and transfers the two groups of articles onto a kiln conveyor to form rows extending at 60° angles to the direction of the kiln conveyor, with the row of support discs being positioned behind the ware pieces and with each support disc being aligned longitudinally of the kiln conveyor with a ware piece in a preceding 60° row. This insures that in a subsequent transfer operation each previously deposited support disc will be properly positioned to receive a ware piece being transferred then.

If desired, however, the present apparatus may be used to transfer two groups of ware pieces at a time, instead of one group of ware pieces and a group of support discs. Also, the present transfer mechanism may be used at the exit of tunnel kiln to unload ware pieces from the kiln conveyor onto another conveyor.

A principal object of this invention is to provide a novel and improved apparatus for simultaneously transferring two groups of articles between two conveyors, with novel provision for selectively changing the spacing between the two groups while the spacing between the articles in each group is changed so that the articles in both groups will be properly aligned with each other at the completion of the transfer operation.

Another object of this invention is to provide a novel and improved kiln loader transfer mechanism which is capable of transferring simultaneously a group of ceramic ware pieces and a plurality of ware piece supports from an inlet conveyor over to a kiln conveyor in such a manner as to provide maximum "packing" of the ware pieces on the kiln conveyor and with the ware piece supports being properly positioned on the kiln conveyor to receive ware pieces in a subsequent transfer operation.

Another object of this invention is to provide a novel and improved transfer mechanism for simultaneously transferring two parallel groups of articles between a position in which each group extends lengthwise of one conveyor and a position in which each group extends transverse to another conveyor.

Another object of this invention is to provide such a transfer mechanism which changes the spacing between the two groups of articles and between the articles of each group so that these spacings are smaller when the groups of articles extend transverse to said other conveyor than when the groups of articles extend lengthwise of said one conveyor.

Another object of this invention is to provide such a transfer mechanism which insures that the articles in the two groups are aligned lengthwise of said other conveyor.

Further objects and advantages of this invention will be apparent from the following detailed description of a presently preferred embodiment thereof, which is shown in the accompanying drawings.

Figure 1:
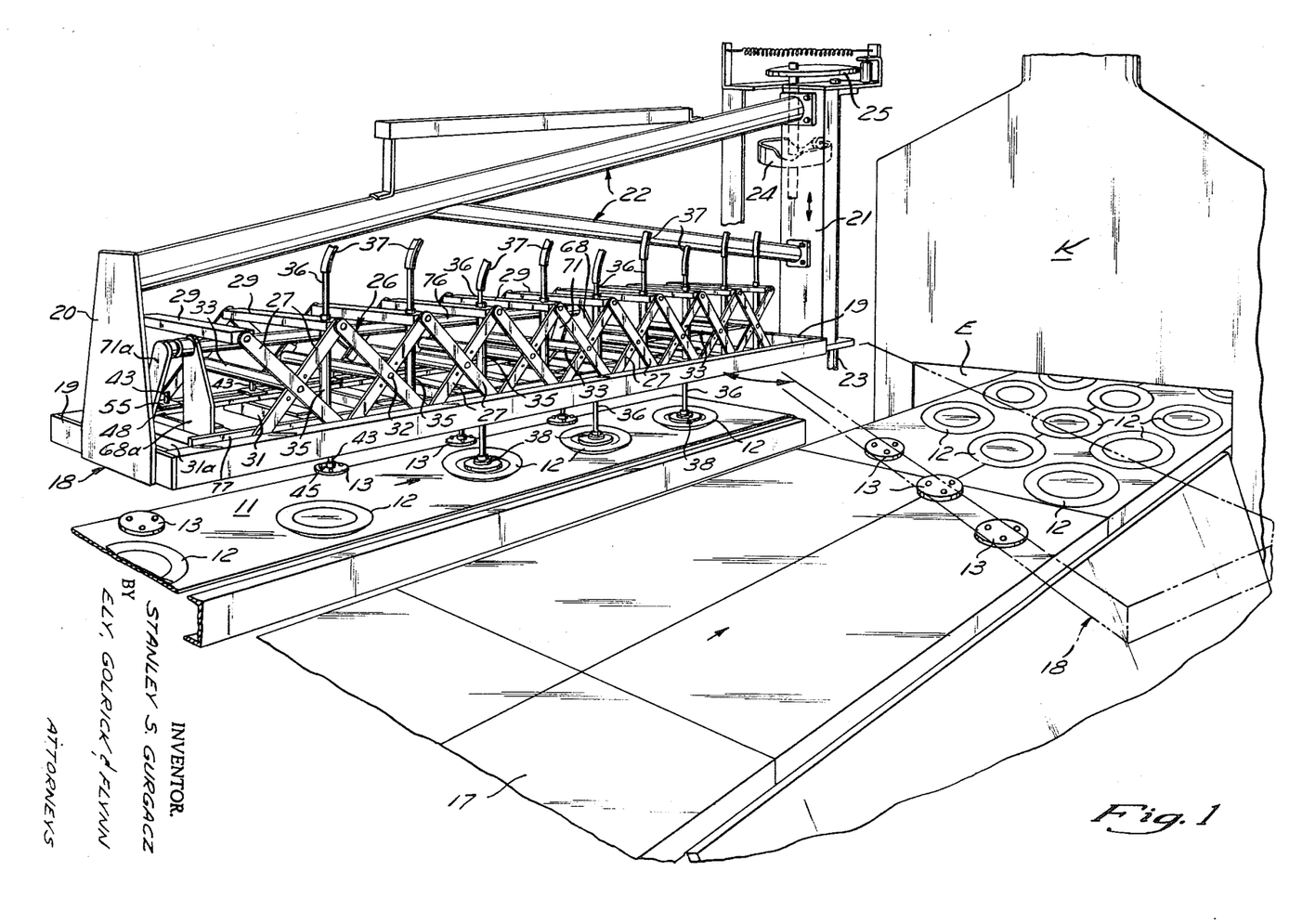
Fig. 1 is a simplified perspective view of the present transfer mechanism, with certain parts omitted for clarity.

Referring to FIG. 1, the ware pieces which are to be fired in the kiln and refractory discs or plates for supporting the ware pieces are carried by an endless inlet conveyor belt 11, which is advanced from left to right, as indicated by the arrow. The ware pieces, which in this instance are shown as dishes 12, are arranged along an inside row running longitudinally of the inlet conveyor belt 11, with the centers of the successive ware pieces being equally spaced apart by a predetermined distance. The ware support discs 13 are arranged along an outside row running longitudinally of the inlet conveyor belt 11 and parallel to the row of ware pieces on the belt. The successive ware support discs 13 are equally spaced apart along this outside row by the same center-to-center distance as the spacing between successive pieces of ware on the inside row.

Figure 2:
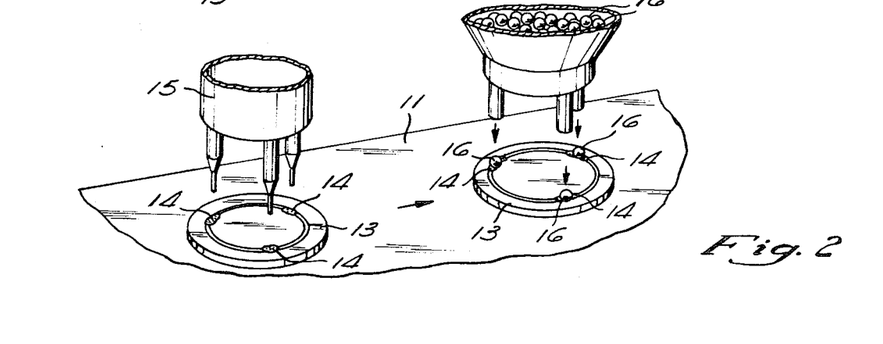
FIG. 2 is a fragmentary perspective view showing apparatus ahead of the FIG. 1 transfer mechanism for securing ware supporting refractory balls to the discs which support the ware pieces on the kiln conveyor.

Referring to FIG. 2, before reaching the loading station shown in FIG. 1, the top face of each ware support disc 13 receives three drops of household glue 14 deposited from a reservoir 15 and thereafter a ball 16 of suitable refractory material, such as alumina, is deposited onto each drop of glue to be held in place on the ware support disc by the glue during the transfer operation to be described. These balls provide three small area, upwardly facing supports for engagement by the underside of the ware piece 12 which is to be supported by this disc 13 on the kiln conveyor. Preferably, these refractory balls 16 are located inside the annular foot on the bottom of each ware piece so that no mark is left on this foot after the ware emerges from the kiln.

For purposes of illustration, FIG. 1 shows the present ware transfer mechanism as arranged to pick up three ware pieces 12 and three ware support discs 13 at a time from the conveyor belt !the conveyor belt 11 and to transfer these three ware pieces and three support discs onto a horizontal kiln conveyor 17, which carries the ware pieces through a tunnel kiln K, whose entrance E is shown in FIG. 1. The kiln conveyor extends parallel to and close to the inlet conveyor belt 11, and it is advanced from left to right in FIG. 1 in synchronism with the conveyor belt 11. This three-piece pickup arrangement may be used for loading relatively large ware pieces onto the kiln conveyor, whereas for smaller pieces of ware this same transfer mechanism may be arranged to transfer a greater number of ware pieces and support discs at a time, as explained in detail hereinafter.

The transfer mechanism at this loading station is essentially similar in many respects to the transfer mechanism disclosed in U.S. Pat. No. 3,360,102 to Howard B. Cummings, which is assigned to the assignee of the present invention. It includes a transfer arm designated in its entirety by the reference numeral 18. The transfer arm 18 has a generally rectangular, rigid, open bottom frame 19 to which is attached an upstanding outer end plate 20 and an upstanding inner end plate 21, and a brace structure 22 rigidly interconnecting the end plates 20, 21 and spaced above the bottom frame 19. The inner end of the transfer arm 18 is attached to a vertically extending pivotal support shaft 23, which preferably is arranged in substantially the same manner as the support shaft 68 in the aforementioned U.S. Pat. No. 3,360,102, as best seen in FIGS. 2, 3, 5, and 7 of said patent. The axis of this support shaft is substantially aligned with the lengthwise row of ware pieces 12 on the conveyor belt 11.

The transfer arm 18 is arranged to be raised and lowered by a motor-driven barrel cam 24, which corresponds to the cam shown at 128 in FIG. 7 of said U.S. Pat. No. 3,360,102. When in its raised position the transfer arm 18 is arranged to be turned horizontally through a 60° arc between the full-line position, in which it longitudinally overlies the inlet conveyor belt 11, to the phantom line position, overlying the kiln conveyor 17 at a 60° angle to the latter's direction of travel, by means of a motor-driven cam 25, which corresponds to the cam shown at 105 in FIG. 7 of said U.S. Pat. No. 3,360,102. Reference may be had to said patent for a detailed description of the operation of these cams. Suffice it to say that this cam-operated mechanism causes the transfer arm 18 overlying the inlet conveyor belt 11 to be lowered vertically to enable the ware pieces 12 and the support discs 13 to be engaged by vacuum cups on the transfer arm, as described hereinafter, and then to be raised vertically to lift the ware pieces and support discs up from the inlet conveyor belt 11, and then swung horizontally counterclockwise in FIG. 1 to a raised position horizontally overlying the kiln conveyor 17 at a 60° angle to the latter's length, and then lowered vertically toward the kiln conveyor for the release of the ware pieces 12 and the support discs 13, and then after such release to be raised vertically and then swung horizontally back to the initial raised position overlying the conveyor belt 11.

A lazy tong frame 26 is mounted on the transfer arm 18 with the lower ends of its pivotally interconnected linkage arms 27 slidably supported by the opposite longitudinal members of the lower frame 19, so that the entire lazy tong frame is slidable longitudinally of the transfer arm 18 in the same manner as described in detail in said U.S. Pat. No. 3,360,102, particularly with reference to FIGS. 3 and 4 thereof. As best seen in the present FIG. 4, the upper ends of the linkage arms 27 at the opposite sides of the lazy tong frame 26 are pivoted on respective upper crossbar 29. Similarly the lower ends of the linkage arms 27 at the opposite sides of the lazy tong frame are pivoted on respective stub shafts 30 on the opposite ends of a respective lower crossbar 31. Also, where the linkage arms cross over at the middle they are pivoted on respective stub shafts 32 on the opposite ends of a respective middle crossbar 33. The stub shafts on the lower crossbars 31 are received in respective antifriction bearings 34 which are slidable along respective tracks on the inside of the longitudinal front and back pieces of the bottom frame 19 of the transfer arm, so that the entire lazy tong frame is freely slidable lengthwise of the transfer arm 18.

Figures 4, 5:
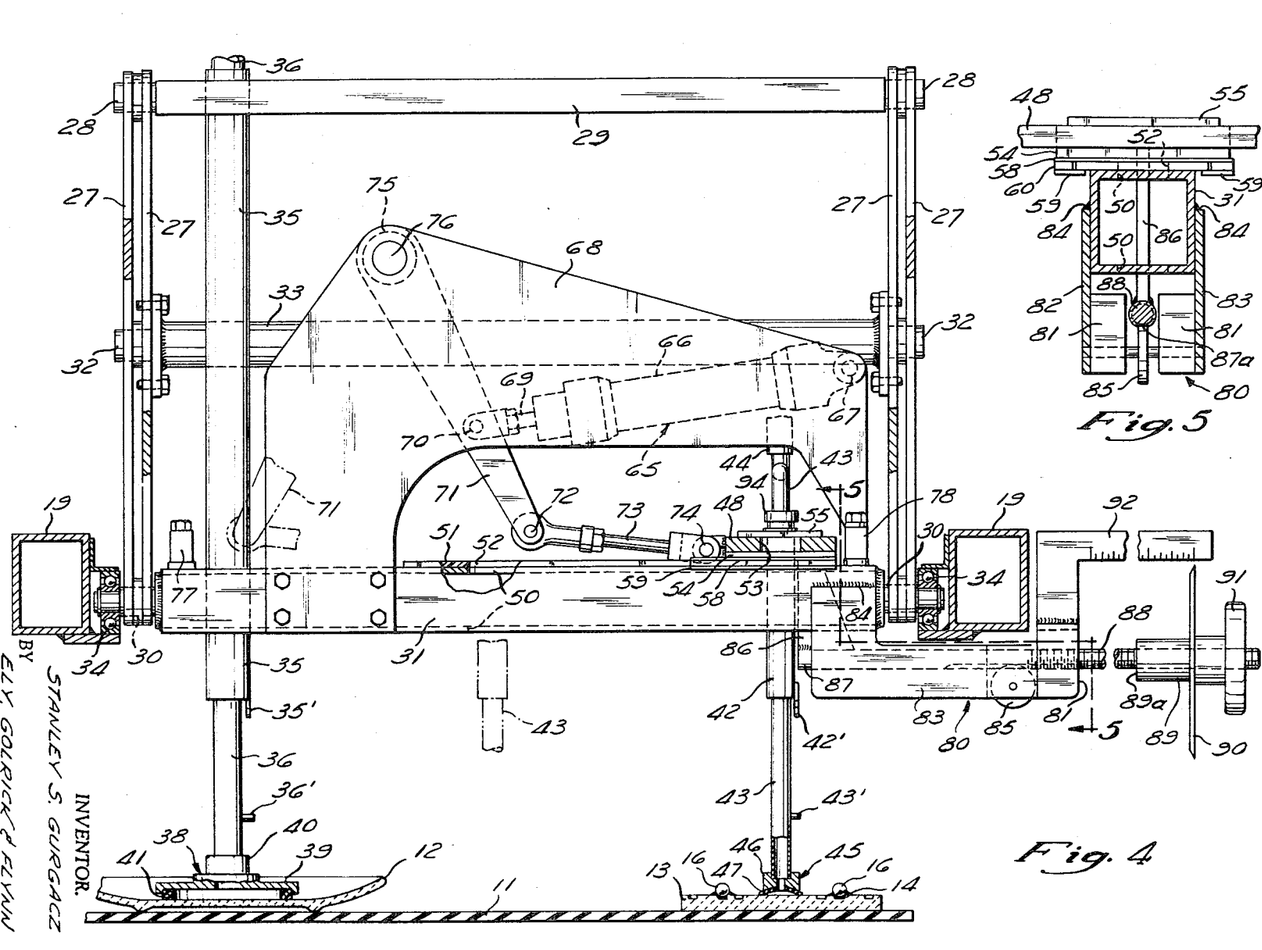
FIG. 4 is an enlarged vertical section taken along the line 4—4 in FIG. 3.
FIG. 5 is a fragmentary vertical section taken along the line 5—5 in FIG. 4.

Near the front side of the lazy tong frame 26 in FIG. 1, a vertically disposed sleeve 35 extends between each vertically aligned pair of the upper and lower crossbars 29 and 31 except the pair at the outer end of the lazy tong frame. Each sleeve 35 slidably receives a respective tubular pickup spindle 36 whose upper end is connected to a respective flexible hose 37. As best seen in FIG. 4, the lower end of each spindle 36 carries a vacuum cup 38, which in this instance comprises a flanged, annular plate member 39 having an upstanding collar 40 attached to the lower end of spindle 36 and carrying an annular gasket 41 of rubberlike material for sealing engagement with the top surface of the ware piece 12.

In FIG. 1, not all of the ware pickup spindles 36 are used and the unused ones are out of sight because they are raised upward along the corresponding sleeves 35 and are locked in their raised positions. For this purpose, a fixed hook 35' on the lower end of each sleeve 35 is adapted to receive a laterally projecting pin 36' on the ware pickup spindle 36 when the latter is raised and turned. A collar (not shown) secured to each ware pickup spindle 36 rests on top of the respective sleeve 35 when the spindle is in its lowered operative position along the sleeve 35. In the particular example shown in FIG. 1, only three of the ware pickup spindles 36 are to be used, and the remaining ones are retracted up toward the underside of the lower frame 19 of the transfer arm 18 so that they will not be effective in the ware transfer operation.

As best seen in FIG. 4, toward the opposite side of the transfer arm 18 (the rear side in FIG. 1) at each of the lower crossbars 31 a depending sleeve 42 is carried by a cross slide 48, which is mounted for reciprocation along these lower crossbars, as explained hereinafter. Each sleeve 42 slidably receives a respective tubular pickup spindle 43 whose upper end is connected to a respective flexible hose 44 and whose lower end carries a respective vacuum cup 45. Each vacuum cup 45 has a rigid annular collar 46 attached to lower end of the respective pickup spindle 43 and a flexible annular sealing member 47 of rubberlike material for engagement with the top face of the respective ware support disc 13.

The same number of disc pickup spindles 43 are used as the number of operative ware pickup spindles 36, and the unused disc pickup spindles 43 are raised up to an inoperative position by sliding them up along the sleeves 42 and locking them in the raised position, preferably by means of a hook 42' on each sleeve 42 and a laterally projecting pin 43' on each spindle 43.

The hoses 37 and 44 for the operative pickup spindles 36 and 43 which are to be used in a transfer operation are connected to vacuum or vented to the atmosphere at different times in each cycle of operation in essentially the same manner as disclosed in the aforementioned U.S. Pat. No. 3,360,102.

As shown in FIG. 1, in the particular embodiment illustrated, when the transfer arm 18 is swung over to the phantom line position it deposits the three picked up ware pieces 12 onto the kiln conveyor 17 along a row extending at an angle of 60° to the latter's direction of travel for maximum "packing" of ware on the kiln conveyor, as explained in said U.S. Pat. No. 3,360,102, and at the same time it deposits the three picked up ware support discs 13 on the kiln conveyor along a a similar 60° row located behind the row of ware pieces 12 then being deposited. The timing of the operation of the transfer arm 18 is correlated with the movement of the inlet conveyor belt 11 and the kiln conveyor 17 such that the ware pieces 12 in a 60° row are deposited on a 60° row of the ware support discs 13 transferred in the immediately preceding cycle of the transfer arm 18. While this arrangement is preferable when a small number of relatively large-sized ware pieces are being transferred at a time, where a larger number of smaller ware pieces are transferred in each transfer operation they can be positioned on the row of support discs 13 which is two rows in front of the row of support discs being transferred in that same transfer operation, as explained hereinafter.

In either arrangement, however, the transfer arm picks up from the inlet conveyor belt 11 a group of ware pieces 12 which are arranged in a row running longitudinally of that belt and a similar group of ware support discs 13 which are arranged in a second row running longitudinally of belt 11, and it deposits the picked-up ware pieces 12 on a row of previously deposited ware support discs 13 on the conveyor belt 17, which row runs transversely of the kiln conveyor, at preferably a 60° angle, and it also deposits the picked up ware support discs 13 on the kiln conveyor in a row spaced behind and running parallel to the row of ware pieces which are then being deposited.

The center-to-center spacing between the ware pieces is substantially greater when they are longitudinally spaced apart along the inlet conveyor belt 11 than when they are laterally spaced apart on the kiln conveyor 17. When on the kiln conveyor, the spacing between the ware pieces should be the minimum practicable for most efficient operation. In order to reduce the center-to-center spacing between adjacent pieces of ware the lazy tong frame 26 must be contracted during the time interval from the pickup from the inlet conveyor belt 11 to the deposit of the picked-up articles on the kiln conveyor 17. Preferably, the mechanism for contracting the lazy tong frame 26 as the transfer arm 18 is moved from a pickup position overlying the inlet conveyor belt 11 to a drop position overlying the kiln conveyor 17 is essentially identical to the mechanism described in said U.S. Pat. No. 3,360,102, beginning at column 10, line 14, under the heading "Spindle spacing and centering mechanism." This mechanism is omitted from the present drawings for the sake of simplicity.

While the "spindle spacing and centering mechanism" described in said patent is admirably suited for adjustably determining the final spacing between the ware pieces 12 in each 60° diagonal row of ware pieces deposited on the kiln conveyor 17, this still leaves the problem of assuring longitudinal alignment (i.e., lengthwise of the kiln conveyor 17) between the ware pieces 12 and the ware support discs 13 transferred from the inlet conveyor belt 11 over to the kiln conveyor 17 in the same cycle of operation of the transfer arm. It will be evident that the center-to-center spacing between each ware piece 12 and the following ware support disc 13 which is aligned with it longitudinally of the kiln conveyor also determines the "packing" of the ware pieces on the kiln conveyor.

In overcoming these critical problems I have provided in the preferred embodiment of the present invention a novel and simplified, yet highly effective, mechanism for insuring that each ware support disc 13 being transferred by the transfer arm 18 is constrained for movement laterally inward on the transfer arm toward the row of ware pieces 12 then being transferred by the transfer arm 18 along a line perpendicular to that row of ware pieces. With this mechanism, now to be described in detail, as the transfer arm 18 is swung over to a position overlying the kiln conveyor 17, not only are the ware pieces 12 carried by the transfer arm moved toward each other and the discs 13 carried by the transfer arm moved toward each other (due to the contraction of the lazy tong frame longitudinally of the transfer arm), but also the row of discs 13 is moved perpendicularly toward the row of ware pieces 12 at the same time, so that in the final position of the transfer arm 18 (overlying the kiln conveyor) each of the discs 13 will be positioned at a predetermined spacing behind the corresponding ware pieces 12 with which it is aligned longitudinally of the kiln conveyor. This predetermined spacing may be adjusted, as explained hereinafter, depending upon the size of the ware pieces.

Figure 3:
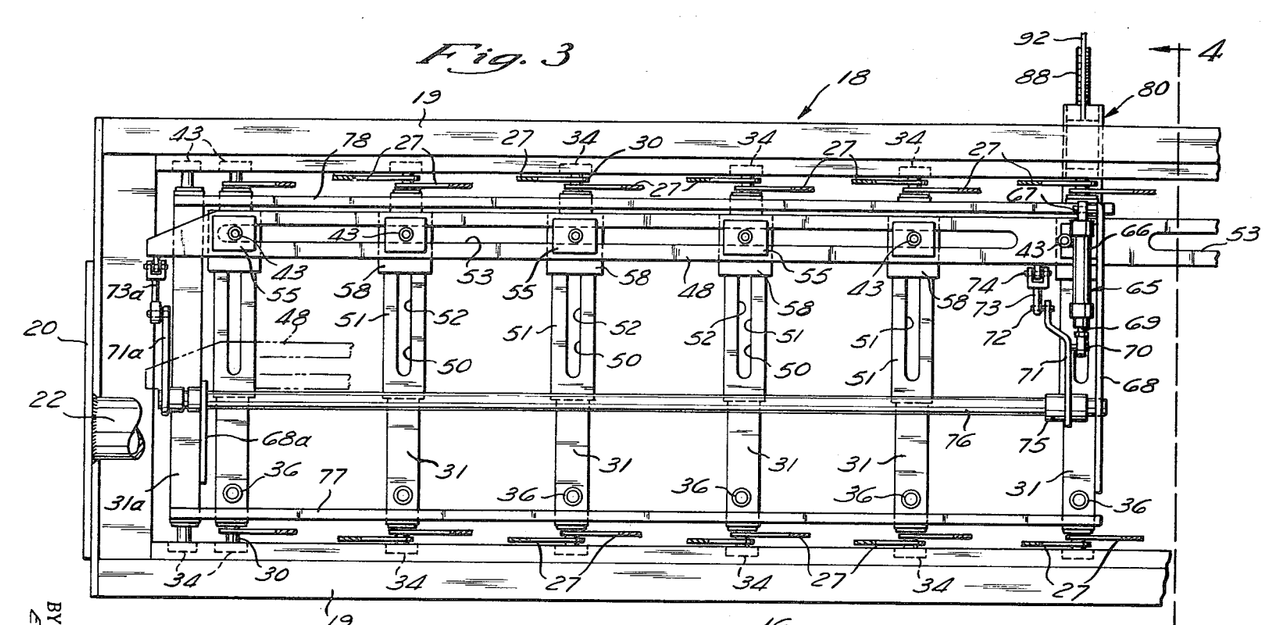
FIG. 3 is a top plan view of the outer half of the FIG. 1 transfer mechanism, with certain parts omitted for clarity.
Figure 6:
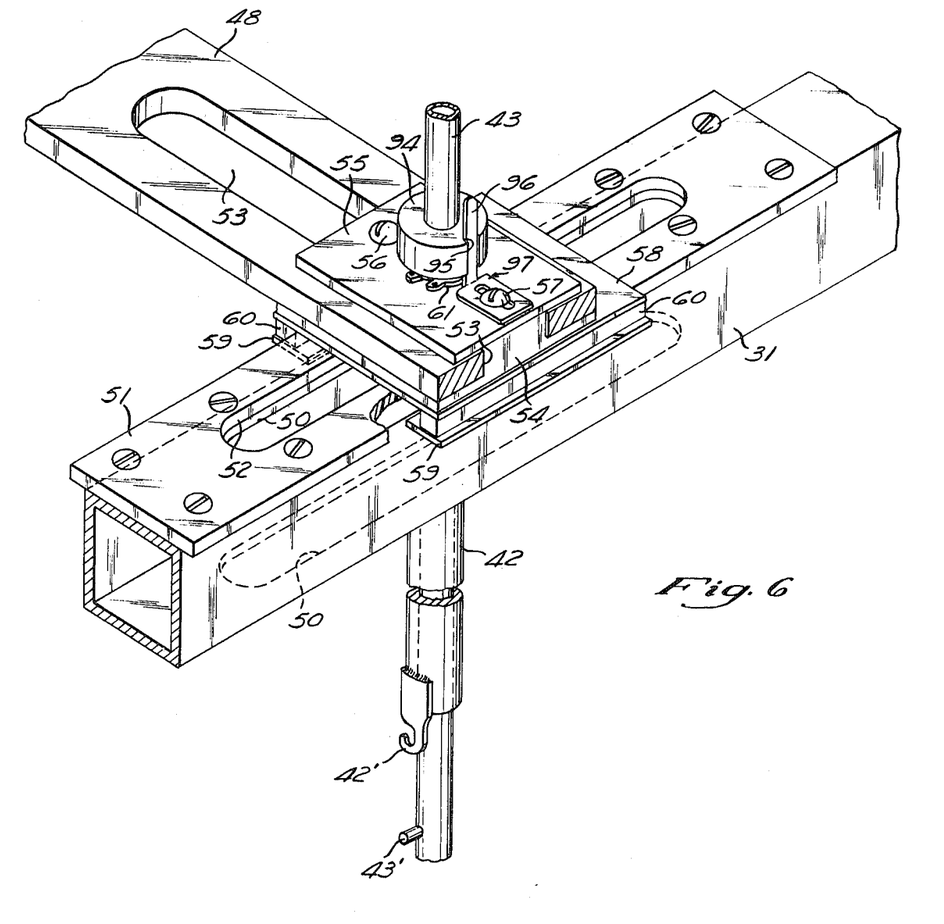
FIG. 6 is an enlarged fragmentary perspective view showing the coaction between the cross slide and other parts of the lazy tong frame in the present transfer mechanism.

Referring to FIGS. 6, 3 and 1, each of the lower crossbars 31 in the lazy tong frame is rectangular and hollow and has vertically aligned longitudinal slots 50 at the top and bottom through which the respective sleeve 42 extends vertically. A slide plate 51 of Teflon or other antifriction material is bolted to the top of each lower crossbar 31 and it has a longitudinal slot 52 which registers with the crossbar slots 50. The slide plate 51 projects beyond each longitudinal edge of the respective crossbar 31, as best seen in FIG. 6.

The previously mentioned cross slide 48 extends longitudinally of the transfer arm 18 and perpendicularly overlies all of the lower crossbars 31 of the lazy tong frame, which are spaced apart in succession longitudinally of the lazy tong frame. As shown in FIG. 3, the cross slide 48 is formed with a pair of longitudinal slots 53 which cross respective lower crossbars 31.

As best seen in FIG. 6, at each of the lower crossbars 31 of the lazy tong frame the cross slide 48 is slidably coupled to the crossbar. This coupling includes an inverted T-slide 54 of Teflon or other suitable antifriction material having its upstanding central portion slidably received in the slot 53 in the cross slide 48 and having its opposite side projections slidably engaging the bottom of the cross slide on opposite sides of its slot 53. A slide plate 55 of Teflon or other suitable antifriction material slidably overlies the top of the cross slide 48 and is attached to the upstanding central portion of the T-slide 54 by a pair of bolts 56, 57. A metal plate 58 is attached to the bottom face of the T-slide 54 and extends completely across and slightly beyond the slotted Teflon slide plate 51 bolted to the top of the respective lower cross arm 31 of the lazy tong frame. At each longitudinal edge of the respective cross arm 31 a respective metal plate 59 extends beneath the projecting longitudinal edge of the slide plate. A Teflon spacer 60 is sandwiched between each of the plates 59 and the plate 58 which overlies the slide plate 51, and each of these spacers 60 slidably engages the corresponding longitudinal edge of the slide plate 51.

Each of the aforementioned sleeves 42 for the disc pickup spindles 43 extends slidably through the slots 50 in the respective lower cross bar 31 of the lazy tong frame and slidably through the slot 52 in slide plate 51 and up through openings in the plate 58, T-slide 54 and plate 55 of the coupling. A snap ring 61 overlying plate 55 is received in a peripheral groove in each sleeve 42 to secure the latter to the coupling 55, 54, 58 for movement in unison with the cross slide 48.

A collar 94 attached to each pickup spindle 43, such as by a setscrew, rests on top of the respective sleeve 42 when that pickup spindle is in its operative lowered position along the sleeve. This collar has a longitudinal peripheral slot 95 which receives an upstanding leg 96 on an L-shaped member 97 connected to slide plate 55 and T-slide 54 by bolt 57.

The cross slide 48 is arranged to be moved from the full-line position of FIG. 3, where it is close to the backside of the transfer arm 18 in FIG. 1, to a position closer to the front side of the transfer arm, such as the phantom line position in FIG. 3, by an air cylinder-and-piston unit 65 located approximately midway along the transfer arm 18. As shown in FIGS. 3 and 4, one end of the cylinder 66 of this unit is pivotally connected at 67 to an upstanding plate 68 bolted to one of the lower crossbars 31 of the lazy tong frame. The piston rod 69 of this cylinder-and-piston unit is pivotally connected at 70 to approximately the middle of a lever 71. The lower end of lever 71 is pivotally connected at 72 to one end of a connecting rod assembly 73, whose opposite end is pivotally connected at 74 to the cross slide 48. The upper end of lever 71 is rigidly connected through a sleeve 75 to one end of a torsion bar 76 extending longitudinally of the transfer arm and spaced above the middle crosspieces 33 of the lazy tong frame, as best seen in FIG. 4. (These crosspieces 33 are omitted in FIG. 3 for clarity.) The opposite end of torsion bar 76 (at the outer end of the transfer arm 18) is connected through a similar arrangement of a lever 71a and connecting rod 73a to the outer end of the cross slide 48. The opposite ends of the torsion bar 76 are pivotally supported by the aforementioned plate 68 near the middle of the lazy tong frame and by a similar plate 68a attached to the lower crossbar 31a at the extreme outer end of the lazy tong frame. A pair of longitudinal bars 77, 78 rigidly connect the crossbar 31a to the lower crossbar 31 from which the cylinder-and-piston unit 65 and the opposite end of torsion bar 76 are supported, so as to move in unison with this lastmentioned crossbar. Crossbar 31a is slidably supported by the front and backsides of the lower frame 19 of the transfer arm 18 in the same manner as the other lower crossbars 31 of the lazy tong frame, but it is not connected to the cross links 27 of the lazy tong frame.

When pressurized air is introduced into the cylinder 66 the piston rod moves to the left in FIG. 4 (toward the front side of the transfer arm 18 in FIG. 1), rocking the lever 71 clockwise in FIG. 4 to pull the cross slide 48 to the left (i.e., laterally inward on the transfer arm 18 toward the front side of the transfer arm in FIG. 1). This takes place during the movement of the transfer arm 18 from the full-line position in FIG. 1, in which it longitudinally overlies the inlet conveyor 11, to the phantom line position, in which it overlies the kiln conveyor 17 at a 60° angle.

The maximum possible stroke of the cross slide is determined by the length of the slots 50, 52 on the lower crossbars 31 of the lazy tong frame.

However, in accordance with an important feature of the present invention, the stroke of the cross slide 48 may be limited to any predetermined distance so as to produce the desired final center-to-center spacing lengthwise of the kiln conveyor 17 between each ware piece 12 transferred and the following support disc 13 which is transferred at the same time and which must be aligned with the respective ware piece longitudinally of the kiln conveyor so that it will be properly positioned to receive a ware piece in a subsequent transfer operation.

As shown in FIGS. 4 and 5, the lower crossbars 31 of the lazy tong frame from which the air cylinder 66 is supported also rigidly supports a stop member 80 which presents a fixed stop shoulder 81 located behind the back longitudinal member of the lower frame 19 of the transfer arm 18 in FIG. 1. This stop member 80 has opposite side pieces 83 which are welded at 84 to opposite sides of this crosspiece 31. The stop member 80 rotatably supports a roller 85.

Rigidly attached to the cross slide 48 and extending downward therefrom is a plate 86 (FIG. 4). A horizontally positioned rod 87 is welded to the lower end of plate 86 and extends rearward therefrom (to the right in FIG. 4). This rod has a longitudinal slot 87a at the bottom which snugly, but slidably, engages the top of roller 85, as best seen in FIG. 5. The back end of rod 87 is screw threaded, as shown at 88 in FIG. 4, and it is threadedly engaged by a nut member 89 carrying a pointer disc 90. A locking nut 91 is provided for clamping the nut member 89 at any selected position along the screw-threaded portion 88 of rod 87. The inner end 89a of nut member 89 is engageable with the fixed stop 81 to limit the inward movement (to the left in FIG. 4) of the cross slide 48 to which rod 87 is attached.

A suitably calibrated scale 92 is attached to the stop member 80 adjacent the upper end of the pointer disc 90 carried by nut member 89. This scale is calibrated in terms of the stroke of the cross slide from its initial position when the transfer arm 18 overlies the inlet conveyor belt 11, at which time the piston rod 69 is fully retracted, and its final position as determined by the engagement of nut member 89 against the fixed stop 81. Obviously, the position of nut member 89 along the screw-threaded portion 88 of rod 87 determines the length of the cross slide stroke.

Figure 7:
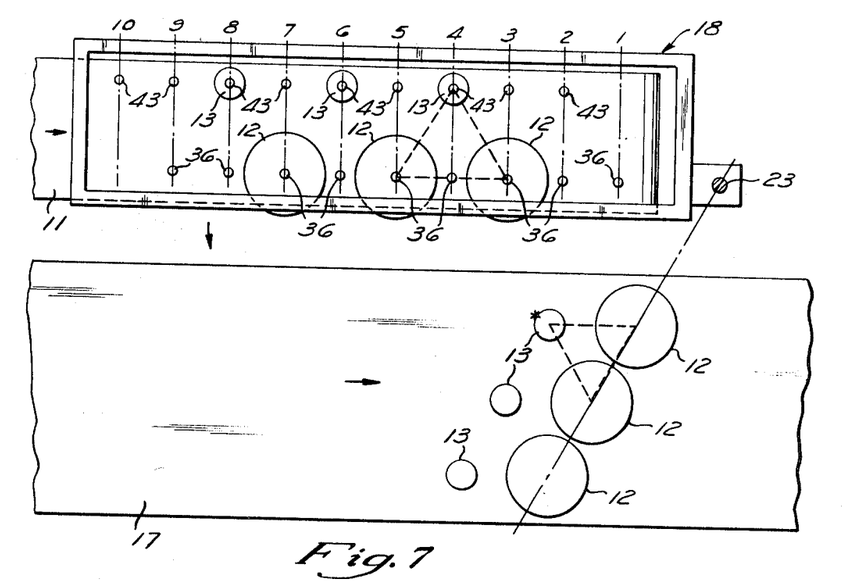
FIG. 7 is a schematic plan view showing the operation of the transfer mechanism in transferring three large ware pieces and three ware support discs at one time.

Referring to FIG. 7, in one practical embodiment of the present invention the lazy tong frame on the transfer arm 18 carries nine ware pickup spindles 36 and nine support disc pickup spindles 43. In the extended position of the lazy tong frame (when it overlies the inlet conveyor 11), the ware pickup spindles are evenly spaced apart lengthwise of the transfer arm 18 a distance of 8 inches, center-to-center, as are the support disc pickup spindles. The row of support disc pickup spindles 43 is spaced laterally of the transfer arm 18 a distance of 12½ inches from the row of ware pickup spindles 36 when the transfer arm overlies the conveyor belt 11. The support disc pickup spindles 43 are offset by one position from the ware pickup spindles 36. That is, while the first ware pickup spindle 36 is located at position "1" longitudinally of the transfer arm 18 outward from its pivot 23, the first disc pickup spindle 43 is at position "2," in alignment with the second ware pickup spindle 36, and so on.

FIG. 7 illustrates the arrangement depicted in FIG. 1, where only three support disc pickup spindles 43 and three ware pickup spindles 36 are to used, with the remaining pickup spindles being retracted up to an inoperative position. The first two operative ware pickup spindles 36 are at positions 3 and 5, respectively, so that they are 16 inches apart (center-to-center), and the first operative support disc pickup spindle 43 is at position 4, which is midway between positions 3 and 5. The centers of the first two ware pickup spindles 36 and the first support disc pickup spindle 43 may be regarded as the corners of a triangle (shown in dashed lines in FIG. 7) having two sides equal (the respective sides from the center of spindle 43 to the centers of spindles 36). The base of this triangle (between the centers of the two ware pickup spindles 36) is slightly longer than its other two sides.

As already explained, the base of this triangle is shortened as the transfer arm 18 is swung horizontally from a position overlying the conveyor belt 11 (as shown at the top of FIG. 7) to a position overlying the kiln conveyor 17 (as shown at the bottom of FIG. 7). This shortening of the triangle base occurs because of the partial retraction of the lazy tong frame, as described, so as to effectively minimize the spacing between the three ware pieces 12 deposited in a 60° row on the kiln conveyor.

The operation of the lazy tong frame is such that the apex of this triangle (at the center of the first support disc pickup spindle 43) would remain equally spaced from the base corners (at the respective centers of the two ware pieces) as the transfer arm 18 is swung over even if the apex were held at the initial distance from the base of the triangle. That is, this relationship could be maintained if the row of support disc pickup spindles 43 were held at the initial spacing of 12½ inches from the row of ware pickup spindles 36 in the lateral direction perpendicular to the length of the transfer arm 18, in which case the center of the first disc pickup spindle 43 would end up at the position designated by the asterisk on the lower half of FIG. 7.

However, as will be evident from this asterisk position, this would not be a satisfactory arrangement for two reasons:

1. the support discs 13 would not be aligned longitudinally of the kiln conveyor 17 with the ware pieces 12 transferred in the same transfer operation, and therefore these discs would not be properly positioned to receive the ware pieces transferred in the next operation of the transfer arm; and 2. the row of support discs 13 would have an excessive spacing lengthwise of the kiln conveyor from the row of ware pieces 12 transferred in the same transfer operation, so that maximum packing of the ware pieces would not be achieved.

However, in accordance with the present invention, the apex of the triangle (at the center of the first operative support disc pickup spindle 43) is moved toward the base of the triangle during the horizontal swing of the transfer arm by an amount determined by the initial setting of nut 89 and pointer disc 90 along the screw-threaded portion 88 of rod 87. This determines the distance through which the stop surface 89a on nut 89 can move before it engages the fixed stop 81. This distance is equal to the reduction of the altitude of the triangle during the horizontal swing of the transfer arm. For each size of ware piece to be transferred, the altitude reduction required to have the apex of the triangle end up in alignment with one of the base corners of the triangle in a direction longitudinally of the kiln conveyor can be predetermined, and the initial setting of the pointer disc 90 and nut 89 will correspond to this required altitude reduction. This insures that the ware support discs 13 transferred in a given operation of the transfer mechanism will be positioned on the kiln conveyor 17 in proper longitudinal alignment with the ware pieces 12 transferred in the same transfer operation, so that these discs will be properly positioned to receive the ware pieces transferred in a subsequent operation of the transfer mechanism and maximum packing of the ware pieces on the kiln conveyor can be achieved.

The final triangular relationship (on the kiln conveyor) between the two ware pieces and one support disc is an equilateral triangle. That is, because the spacing of the disc from both ware pieces is the same, and the spacing of the disc from the ware piece with which it is aligned lengthwise of the kiln conveyor is equal to the spacing between the two ware pieces, the spacing between the disc and the other ware piece must be the same, also.

In the particular example given for the transfer arm (having the operative pickup spindles in each row spaced apart lengthwise of the transfer arm by 16 inches, center-to-center, and with the two rows spaced apart laterally of the transfer arm by 12½ inches) the arrangement shown in FIG. 7 may be used for circular ware pieces of from 10½ inches to 12 inches in diameter.

For 12-inch diameter ware the final center-to-center spacing between the ware pieces 12 or the discs 13 in each 60° row on the kiln conveyor 17 is 12½ inches, the final center-to-center spacing lengthwise of the kiln conveyor between the row of ware pieces and the row of support discs transferred in the same transfer operation is 12½ inches, and the inward movement of the cross slide 48 laterally of the transfer arm 18 is 1.675 inches.

For 10½-inch diameter ware the final center-to-center spacing between the ware pieces or the support discs in each 60° row on the kiln conveyor 17 is 11 inches, the center-to-center spacing lengthwise of the kiln conveyor between the row of ware pieces and the row of support discs transferred in the same transfer operation is 11 inches, and the inward movement of the cross slide 48 laterally of the transfer arm 18 is 2.98 inches.

For ware pieces of from 8 to 10 inches in diameter, the operative pickup spindle positions on transfer arm 18 are positions 2, 4, 6, 8 for the ware pickup spindles 36 and positions 3, 5, 7, 9 for the support disc pickup spindles 43, so that four ware pieces 12 and four support discs 13 are transferred in each transfer operation.

For 10-inch diameter ware the final center-to-center spacing between the ware pieces or the discs in each 60° row on the kiln conveyor 17 is 10½ inches, the center-to-center spacing lengthwise of the kiln conveyor between the row of ware pieces and the row of support discs transferred in the same transfer operation is 10½ inches, and the inward movement of the cross slide 48 laterally of the transfer arm 18 is 3.407 inches.

For 8-inch diameter ware the final center-to-center spacing between the ware pieces or the support discs in each 60° row on the kiln conveyor 17 is 8½ inches, the center-to-center spacing lengthwise of the kiln conveyor between the row of ware pieces and the row of support discs transferred in the same transfer operation is 8½ inches, and the inward movement of the cross slide 48 laterally of the transfer arm 18 is 5.14 inches.

For ware pieces of from 6⅝ to 7½ inches in diameter, the positions of the operative ware pickup spindles 36 on the transfer arm are positions 1, 3, 5, 7, 9 and the positions of the operative disc pickup spindles 43 are positions 2, 4, 6, 8, 10, so that five ware pieces 12 and five support discs 13 are transferred in each transfer operation.

For 7½-inch diameter ware the final center-to-center spacing between the ware pieces or the discs in each 60° row on the kiln conveyor 17 is 8 inches, the center-to-center spacing lengthwise of the kiln conveyor between the row of ware pieces and the row of support discs transferred in the same transfer operation is 8 inches, and the inward movement of the cross slide 48 laterally of the transfer arm 18 is 5.58 inches.

For 6⅝-inch diameter ware the final center-to-center spacing between the ware pieces or the support discs in each 60° row on the kiln conveyor 17 is 7⅛ inches, the center-to-center spacing lengthwise of the kiln conveyor between the row of ware pieces and the row of support discs transferred in the same transfer operation is 7⅛ inches, and the inward movement of the cross slide 48 laterally of the transfer arm 18 is 6.33 inches.

For the particular transfer arm under discussion, when the ware piece diameter is 6½12) inches or smaller the arrangement is such that in each transfer operation the ware support discs 13 are deposited on the kiln conveyor two 60° rows (instead of one) behind the 60° row of ware pieces 12 being deposited at the same time.

Figure 8:
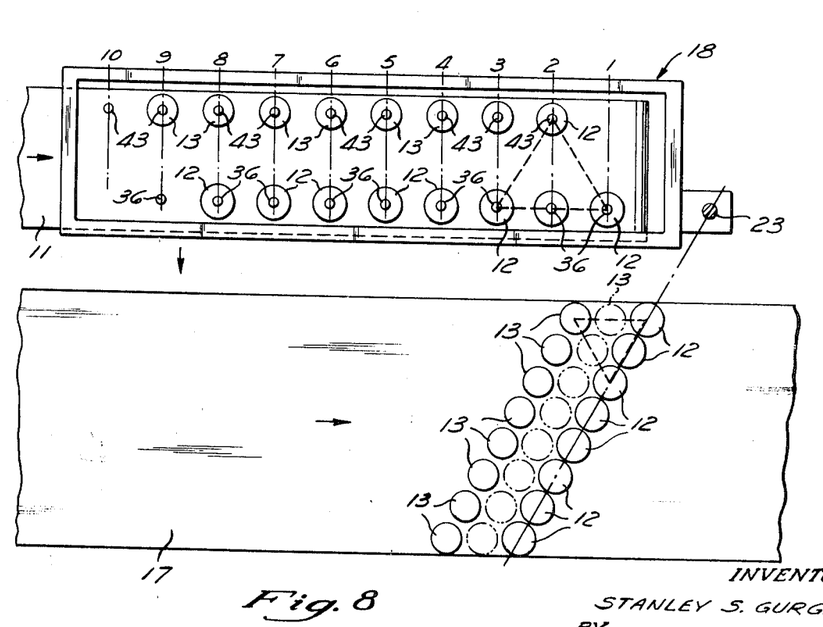
FIG. 8 is a similar view showing the operation of the mechanism in transferring eight small ware pieces and eight ware support discs at a time.

An illustration of this is depicted in FIG. 8, which shows an arrangement for transferring ware pieces of from 4 to 4⅝ inches in diameter. The operative ware pickup spindles 36 are at positions 1, 2, 3, 4, 5, 6, 7, 8 along the transfer arm 18, and the operative disc pickup spindles 43 are at positions 2, 3, 4, 5, 6, 7, 8, 9 on the transfer arm, so that in each transfer operation eight ware pieces 12 and eight ware support discs 13 are transferred. The first operative disc pickup spindle 43 (at position 2) forms a triangle with the first and third ware pickup spindles 36 (at positions 1 and 3) and is equally spaced from the latter at all times.

As the transfer arm 18 is swung horizontally from a position overlying the conveyor belt 11 (as shown at the top of FIG. 8) over to a position overlying the kiln conveyor 17 (as shown at the bottom of FIG. 8), the lazy tong frame is contracted longitudinally of the transfer arm to position the ware pieces 12 closer together and at the same time the cross slide 48 moves inward laterally on the transfer arm through a distance effective to position the row of ware support discs 13 two rows behind the row of ware pieces then being transferred, with each support disc 13 being aligned with a ware piece 12 longitudinally of the kiln conveyor. The intervening row of discs 12, shown in phantom in FIG. 8, will have been deposited on the kiln conveyor 17 in the immediately preceding operation of the transfer mechanism.

For 4⅝-inch-diameter ware the final center-to-center spacing between the ware pieces or the discs in each 60° row on the kiln conveyor 17 is 5⅛ inches, the center-to-center spacing lengthwise of the kiln conveyor between the row of ware pieces and the row of support discs transferred in the same transfer operation is 10¼ inches, and the inward movement of the cross slide laterally of the transfer arm is 3.62 inches.

For 4-inch-diameter ware the final center-to-center spacing between the ware pieces or the discs in each 60° row on the kiln conveyor is 5 inches, the final center-to-center spacing lengthwise of the kiln conveyor between the row of ware pieces and the row of support discs being transferred at the same time is 10 inches, and the inward movement of the cross slide laterally of the transfer arm is 3.84 inches.

For ware pieces of from 4¾ to 5 inches, the operative ware pickup spindles 36 are at positions 2, 3, 4, 5, 6, 7, 8, and the operative support disc pickup spindles 43 are at positions 3, 4, 5, 6, 7, 8, 9 so that seven ware pieces 12 and seven support discs 13 are transferred at one time, with the support discs 13 being deposited on the kiln conveyor 17 two 60° row behind the ware pieces 12 deposited at the same time.

For 5-inch diameter ware the final center-to-center spacing between the ware pieces or the discs in each 60° row on the kiln conveyor 17 is 5½ inches, the center-to-center spacing lengthwise of the kiln conveyor between the row of ware pieces and the row of support discs transferred in the same transfer operation is 11 inches, and the inward movement of the cross slide 48 laterally of the transfer arm 18 is 2.98 inches.

For 4¾-inch diameter ware the final center-to-center spacing between the ware pieces or the support discs in each 60° row on the kiln conveyor 17 is 5¼ inches, the center-to-center spacing lengthwise of the kiln conveyor between the row of ware pieces and the row of support discs transferred in the same transfer operation is 10½ inches, and the inward movement of the cross slide 48 laterally of the transfer arm 18 is 3.41 inches.

For ware pieces of from 5⅝ to 6½ inches in diameter the operative ware pickup spindles 36 are at positions 2, 3, 4, 5, 6, 7 on the transfer arm 18 and the operative disc pickup spindles 43 are at positions 3, 4, 5, 6, 7, 8, so that six ware pieces 12 and six support discs 13 are transferred at one time, with the support discs being deposited on the kiln conveyor 17 two 60° rows behind the ware pieces deposited at the same time.

For 6½-inch diameter ware the final center-to-center spacing between the ware pieces or the discs in each 60° row on the kiln conveyor 17 is 7 inches, the center-to-center spacing lengthwise of the kiln conveyor between the row of ware pieces and the row of support discs transferred at the same time is 14 inches, and the inward movement of the cross slide 48 laterally of the transfer arm 18 is 0.376 inch.

For 5⅝-inch diameter ware the final center-to-center spacing between the ware pieces or the support discs in each 60° row on the kiln conveyor 17 is 6⅛ inches, the center-to-center spacing lengthwise of the kiln conveyor between the row of ware pieces and the row of support discs transferred at the same time is 12¼ inches, and the inward movement of the cross slide 48 laterally of the transfer arm 18 is 1.892 inches.

From the foregoing description with reference to the drawings, it will be apparent that the illustrated embodiment of the present invention enables a group of ware pieces and a group of ware support discs to be transferred simultaneously from an inlet conveyor over to a kiln conveyor in such a manner as to enable maximum packing of the ware pieces on the kiln conveyor and proper alignment between the ware support discs and the ware pieces longitudinally of the kiln conveyor, so that each disc will be properly positioned to receive a ware piece in a subsequent transfer operation. However, it is to be understood that this apparatus may be used to transfer two groups of ware pieces at a time if the firing operation is such that ware support discs are not needed and the ware pieces may rest directly on the kiln conveyor.

Also, it will be recognized that by suitable modification the present transfer mechanism may be adapted for unloading the ware pieces from the kiln conveyor at the exit of the kiln.

Also, it is to be understood that the present transfer mechanism may be used for transferring articles other than ceramic ware pieces from one conveyor to another, if desired.

What is claimed is:

1. Apparatus for simultaneously transferring two groups of articles from a first conveyor to a second conveyor running substantially parallel to the first conveyor comprising: a transfer mechanism having two rows of evenly spaced article pickup members, means for moving said transfer mechanism between a first position overlying said first conveyor in which each of the rows of pickup members extends longitudinally of the first conveyor and a second position overlying said second conveyor in which each of the rows of pickup members extends at a predetermined acute angle to the length of the second conveyor, means in said transfer mechanism operative when the transfer mechanism is moved from said first position to said second position for reducing the spacing between the pickup members in each row, and means on said transfer mechanism operative when the transfer mechanism is moved from said first position to said second position for reducing the spacing between the two rows of pickup members so as to align each of the pickup members in one of the rows with a corresponding one of the pickup members in the other of the rows in a direction lengthwise of the second conveyor, said transfer mechanism having a longitudinally contractable and expandable frame carrying the two rows of pickup members and which contracts lengthwise to reduce the spacing between the pickup members in each of the rows when the transfer mechanism is moved from said first position to said second position, said longitudinally contractable and expandable frame being a lazy tong frame which maintains the pickup members in each of the rows evenly spaced apart while reducing the spacing between them, a cross slide carrying one of the rows of pickup members and slidably mounted on the lazy tong frame for movement perpendicular to the latter's length, an air cylinder-and-piston unit coupled to said cross slide for moving the latter toward the other of the rows of pickup members on the lazy tong frame during movement of the transfer mechanism from said first position to said second position, and adjustable means coacting between said cross slide and said lazy tong frame for selectively limiting the movement of the cross slide toward the other row of pickup members.

2. Apparatus for simultaneously transferring two groups of articles from a first conveyor to a second conveyor running substantially parallel to the first conveyor comprising: a transfer mechanism having two rows of evenly spaced article pickup members, means for moving said transfer mechanism between a first position overlying said first conveyor in which each of the rows of pickup members extends longitudinally of the first conveyor and a second position overlying said second conveyor in which each of the rows of pickup members extends at a predetermined acute angle to the length of the second conveyor, means in said transfer mechanism operative when the transfer mechanism is moved from said first position to said second position for reducing the spacing between the pickup members in each row, and means on said transfer mechanism operative when the transfer mechanism is moved from said first position to said second position for reducing the spacing between the two rows of pickup members so as to align each of the pickup members in one of the rows with a corresponding one of the pickup members in the other of the rows in a direction lengthwise of the second conveyor, said transfer mechanism having a longitudinally contractable and expandable frame carrying the two rows of pickup members and which contracts lengthwise to reduce the spacing between the pickup members in each of the rows when the transfer mechanism is moved from said first position to said second position, said longitudinally contractable and expandable frame comprising a plurality of crosspieces extending perpendicular to its length between its opposite longitudinal sides, a cross slide extending longitudinally of said frame and crossing each of said crosspieces, and further comprising at each crossing between the cross slide and one of said frame crosspieces a coupling which slidably engages both the cross slide and the respective frame crosspiece for sliding movement lengthwise of each, each of said pickup members in said one of the rows being carried by a respective coupling for movement in unison therewith.

3. Apparatus according to claim 2, wherein said cross slide transversely overlies said frame crosspieces, and said cross slide and each of said frame crosspieces is longitudinally slotted, with a slot in the cross slide crossing a slot in each frame crosspiece, and with each pickup member extending down through a slot in the cross slide and a slot in the frame crosspiece.